United States Patent [19]

Kuisma

[11] Patent Number: 4,609,966
[45] Date of Patent: Sep. 2, 1986

[54] ABSOLUTE PRESSURE TRANSDUCER

[75] Inventor: Heikki Kuisma, Helsinki, Finland

[73] Assignee: Vaisala Oy, Helsinki, Finland

[21] Appl. No.: 784,198

[22] Filed: Oct. 4, 1985

[30] Foreign Application Priority Data

Oct. 11, 1984 [FI] Finland ............................ 843989

[51] Int. Cl.[4] ............................................ H01G 7/00
[52] U.S. Cl. ...................................... 361/283; 73/724
[58] Field of Search .................... 361/283; 73/718, 724

[56] References Cited

U.S. PATENT DOCUMENTS

| 4,405,970 | 9/1983 | Swindal et al. | 361/283 |
| 4,467,394 | 8/1984 | Grantham et al. | 361/283 |
| 4,495,820 | 1/1985 | Shimada et al. | 73/724 |
| 4,530,029 | 7/1985 | Beristain | 361/283 |

*Primary Examiner*—Donald A. Griffin
*Attorney, Agent, or Firm*—Birch, Stewart, Kolasch & Birch

[57] ABSTRACT

Described herein is a capacitive absolute pressure transducer including a flat base plate (9) of insulating material, e.g., of glass, with a fixed capacitor electrode (10), aligned on the base plate. A silicon-material moving diaphragm electrode (5) of the capacitor is at least partly aligned with the fixed electrode (10), properly spaced to implement a hermetically sealed vacuum chamber (7) between the fixed electrode (10) and moving diaphragm electrode (5). Electrical contacts (12) are attached to the fixed electrode (10) and the moving diaphragm electrode (5). According to the invention, the flat base plate (9) is bonded to an electrically conductive wafer (8) to implement a laminated substrate (2), the diaphragm electrode (5) fabricated integral with a surrounding and essentially thicker collar part (18), and the electrical contact to the fixed capacitor plate (10) in the area of the vacuum chamber (7) is a well (11, 12) extending through the base plate (9) to the wafer (8).

13 Claims, 8 Drawing Figures

ABSOLUTE PRESSURE TRANSDUCER

The present invention relates to a capacitive absolute pressure transducer in accordance with the preamble of claim 1.

For prior-art technology, the following publications are referred to:
(1) C. S. Sander, J. W. Knutti, J. D. Meindl, IEEE Transactions of Electron Devices, Vol. ED-27 (1980) No. 5 pp. 927...930
(2) U.S. Pat. No. 4,261,086
(3) U.S. Pat. No. 4,386,453
(4) U.S. Pat. No. 4,384,899
(5) U.S. Pat. No. 4,405,970
(6) U.S. Pat. No. 3,397,278
(7) K. E. Bean, IEEE Transactions on Electron Devices, Vol. ED-25 (1978) No. 10 pp. 1185...1193

Publication (1) presents a capacitive absolute pressure transducer which comprises an elastic element of silicon and a glass substrate, bonded using the method described in reference (6). The space remaining between the elastic element and the glass substrate operates as the vacuum chamber of the transducer. A pressure responsive capacitance is formed between the elastic element and the metal film on the glass substrate. The electrical connection to the metal film on the glass substrate is formed by a diffused conductor on the silicon, using a different conduction type material. The greatest disadvantage of the transducer is the large and strongly temperature-dependent depletion region capacitance which is connected in parallel with the pressure responsive capacitance of the transducer. This decreases the relative dynamic range of the transducer and increases its temperature dependence.

References (2), (3), and (4) describe another pressure transducer implementation, in principle analogous to the one described above. The conductor feed-through is different. It has been implemented with a drilled hole in the glass substrate, internally metallized and hermetically sealed by filling with molten metal (solder). The feed-through presents no parasitic capacitances. However, sealing the holes in mass production is somewhat cumbersome.

Reference (5) describes a transducer in which the silicon substrate and the elastic element are bonded with a thin glass film, manufactured by sputtering or vacuum evaporation. The glass film thickness also controls the spacing between the capacitor electrodes. The advantage of this construction is that the production material is almost entirely of silicon. This ensures good temperature stability characteristics. However, the parasitic capacitances associated with the glass seal deteriorate the performance of the transducer. In the methods referred to above, the glass substrate thickness may be maximally 10 $\mu$m which corresponds by its capacitance to an air dielectric capacitor of 2 $\mu$m electrode spacing. Consequently, the proportion of the seal area is dominant for the transducer capacitance unless the transducer area is very large.

Reference (5) also describes a construction in which a high glass wall separates the two silicon components mentioned above. This arrangement avoids the parasitic capacitance problem. On the other hand, the dimensional tolerance of the capacitor air gap will be poor.

For the method of bonding the silicon and glass elements, publication (6) is referred to. The prior art technology for manufacturing the elastic element is described in reference (7).

The object of the present invention is to overcome the drawbacks encountered in the prior-art technology described above and to provide a novel type of capacitive absolute pressure transducer. Silicon and borosilicate glass are preferably used as fabrication materials for the transducer. The transducer construction is such that the electrodes of the pressure responsive capacitor are incorporated in a vacuum chamber, protected against contact with the pressure signal exerting medium. The construction allows the capacitance between the capacitor plates within the vacuum chamber to be measured externally to the transducer.

The transducer in accordance with the invention is based on the following ideas:

In a capacitive pressure transducer the pressure responsive capacitance is formed between an elastic element, fabricated of silicon, and a metal film on a substrate.

The space between the plates of the pressure responsive capacitor is formed by a moat, or well, fabricated either in the elastic element or the substrate.

A chamber is formed between the substrate and the elastic element, filled at the sealing stage with the desired reference pressure or vaccum; the pressure responsive capacitor being constructed inside this chamber.

The substrate is constructed by laminating a a thinner glass plate and a thicker silicon wafer.

The glass plate part of the substrate incorporates within the vacuum chamber area a well or hole which pierces the glass plate and is at least partly covered by the metal film forming the other electrode of the capacitor, or by its extension, so that the aforementioned metal film forms an electrical contact with the silicon part of the substrate via the aforementioned well or hole.

A metal film is formed on the substrate in the form of a closed ring or a similar almost closed pattern which separates the elastic element on the substrate and areas associated with it on the substrate from those conductive areas on the substrate which are in contact with the glass plate part of the substrate.

The silicon diaphragm of the elastic element, flexed by the applied pressure signal, has the form of a ring, and the silicon structure remaining within the ring has essentially the same thickness as the silicon wafer used in the process and is at least five times as thick as the flexible silicon diaphragm part.

More specifically, the pressure transducer in accordance with the invention is characterized by what is stated in the characterizing part of claim 1.

By means of the invention, considerable advantages are achieved. Thus, the electrical contact to the capacitor plate within the vacuum chamber is such that the following disadvantages are avoided:
parasitic pn junction (cfr. reference (1)),
cumbersome filling of holes (references (2), (3), (4)),
high parallel capacitance via the connecting area (reference (5)), and
problems arising from different temperature expansion coefficients of materials since the substrate is almost entirely of the same material as the elastic element (cf. references (1)...(4)).

The elastic element construction achieves the following characteristics:
high sensitivity,
good I/C linearity, and freedom from temperature dependent bending stress since the center part of the element can be configured sufficiently thick and stiff compared with the flexible part.

Correspondingly, the areas fabricated using a metal film provide the following advantages:

prevention of surface leakage currents on the glass plate from influencing the measurement results (leakage currents are a problem especially in circumstances where the environmental relative humidity exceeds 50% RH), and possibility of placing all conductors of the transducer on a surface in the same plane.

The invention will be examined in more detail in the following by means of the exemplifying embodiments in accordance with the attached drawings.

Figure 1A:
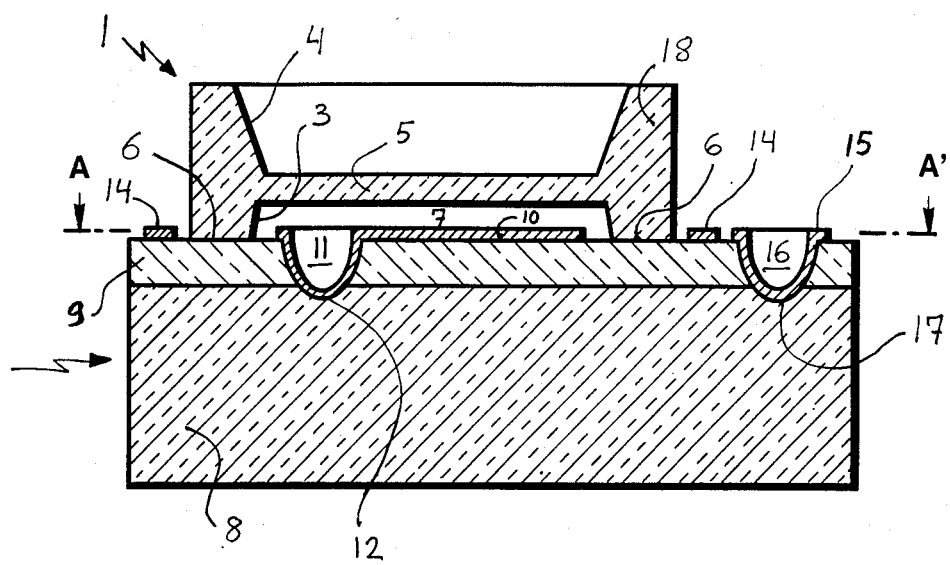
FIGS. 1A and 1B show in a sectional side view and in a sectional top view, one embodiment of the transducer in accordance with the invention.
Figure 1B:
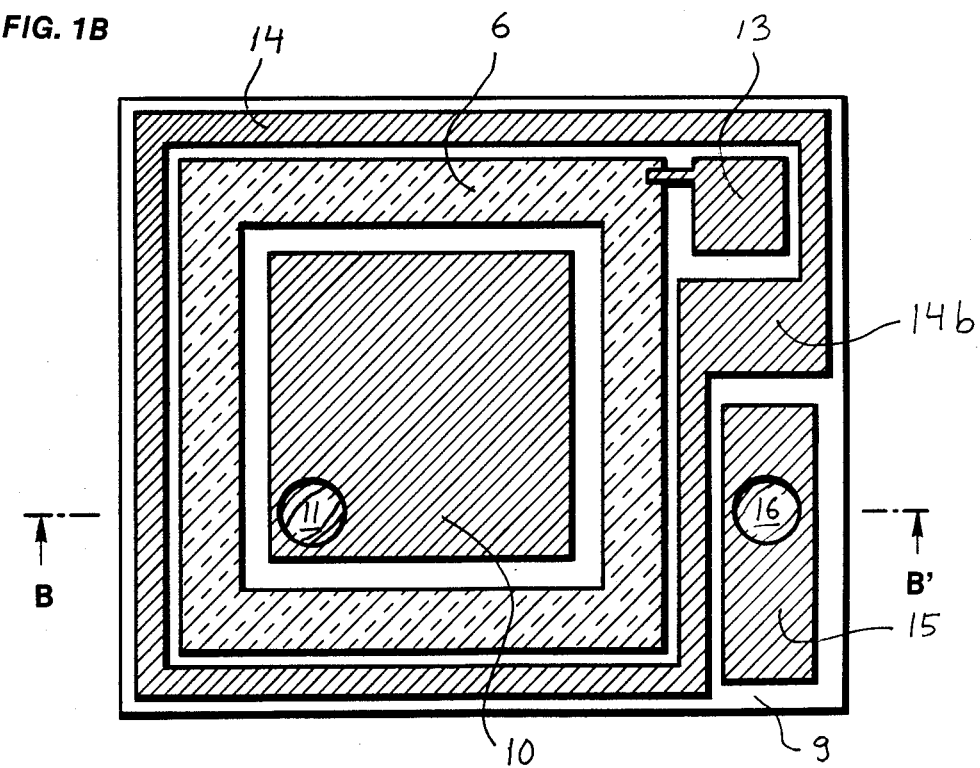

The transducer according to FIGS. 1A and 1B comprises two basic parts: an elastic element 1 and a substrate 2.

The elastic element 1 is fabricated by chemical methods (reference (7)) from a silicon wafer, cut in the $<100>$ plane from a silicon single crystal. The silicon wafer 1 is etched on both sides to form wells 3 and 4, which are surrounded by a collar section 18. The well 3 has a depth of 1... 10 $\mu$m, forming the air gap and vacuum chamber for a pressure responsive capacitor. The well 4, etched on the other side of the silicon wafer, is typically much deeper (200... 400 $\mu$m). In special cases (for measurement of an extremely high pressure), the well 4 can be shallower or omitted. Between the wells 3 and 4 remains in the process a silicon diaphragm 5, with a thickness of 10... 400 $\mu$m, according the transducer pressure range. The silicon diaphragm 5 is flexed when a pressure difference is prevailing between both sides. The elastic element size is typically $2 \times 2$... $10 \times 10$ mm$^2$.

The elastic element 1 is bonded to the substrate 2 on the side of the well 3 using a method described in reference (6). The bond is located in a seal area 6 which seals a hermetic chamber 7, defined by the well 3 and the substrate 2. If the parts are bonded in a vacuum, the chamber 7 will form the vacuum chamber of the transducer and the transducer will operate as an absolute pressure transducer.

The substrate 2 is fabricted by laminating a silicon wafer 8 and a glass plate 9. The preferable thickness for the silicon wafer is 300... 1000 $\mu$m and for the glass plate 100... 500 $\mu$m. The wafer 8 and plate 9 are bonded using the electrostatic method described in reference (6). The material of the glass plate 9 is preferably of alkali borosilicate glass (commercial trade names Corning Glass 7070 and Schott 8284) with a temperature expansion factor close to that of silicon and presenting good dielectric characteristics (low loss and temperature coefficient of dielectric factor). At least the side of the silicon wafer forcing the glass plate is doped highly conductive.

A conductive area 10, consisting of a thin metal film, is formed on the glass plate 9 surface of the substrate 2. The area is located within the area bordered by the seal area 6. Its shape can be square, round, polygonal, or equivalent. The diameter of the conductive area 10 is typically 1... 5 mm. The conductive area 10 forms the other electrode of the pressure responsive capacitor.

The area defined by the seal area 6 includes a well 11, fabricated on the substrate 2 and extending through the glass plate 9 up to the silicon wafer 8. Part of the conductive metal film 10 is located over the area of the well 11, conforming with its surface. On the bottom of the well 11, at point 12, the metal film 10 contacts the silicon wafer 8 to form an electrically conductive path. The well 11 can be fabricated by drilling, grinding, sawing, grit jet abrading, laser machining, chemical machining, or a similar method known in the art. The well shape can be round/point-formed, oblong/slot-formed, closing ring-formed, etc., surrounding the conductive area 10 from all sides. The well diameter (width) can be 100... 1000 $\mu$m.

A conductive area 13 of thin metal film is fabricated partly within the seal area 6, partly outside it, on the surface of substrate 2. The conductive area 13 makes an electrical contact with the elastic silicon element within the seal area 6 without extending across the seal area 6 to the area of the vacuum chamber 7. The main part of the conductive area 13 falls outside the seal area 6. The conductor for attaching the transducer electrode to the measurement electronics is bonded to the area 13. The conductor size can vary between $0.1 \times 0.1$ mm$^2$... $2 \times 2$ mm$^2$, depending on the bonding method.

On the surface of the substrate 2 is also fabricated a conductive area 14 of thin metal film, which as a closed ring encloses the elastic element 1 and the conductive area 13. The area 14 incorporates a wider part 14$b$ for bonding a conductor in the manner described above for the area 13. The purpose of the conductive area 14 is to prevent leakage current flows between the transducer active terminals across the surface and over the edges of the glass plate 9 between the elastic element 1 and the silicon substrate 8. When the area 14 is grounded, the leakage currents are routed from the transducer active terminals to the ground terminal.

Furthermore, a conductive area 15 is fabricated on the surface of the substrate. In addition to the aforementioned well 11, the area 15 has a similar well 16, which extends through the glass plate 9 up to the silicon wafer 8. The metal film 15 conforms to the surface of the well 16 and makes an electrical contact with the silicon wafer 8 at point 17. Thus, an electrical path is formed between the metal films 10 and 15 via the silicon wafer 8. The details of fabrication, form, and dimensions of the well 16 are identical with those described for well 11. The shape of the area 15 is such that it at least partly covers the well 16 and additionally provides a pad for bonding a conductor in the same way as for the areas 13 and 15.

Within the scope of the invention, other embodiments, different from those shown in FIGS. 1A and 1B, are also feasible.

FIGS. 2, 3, 4A, 4B, and 5 show such embodiments which can be considered for the elastic element (i.e., the part flexed by the pressure and the support construction immediately associated with it) of a transducer in accordance with the present invention. Alternatives 2 and 3 are conventional as regards the elastic element, and they are already described in references (1)... (4). The item numbering is partly analogous with the numbering in FIGS. 1A, 1B.

Figure 2:
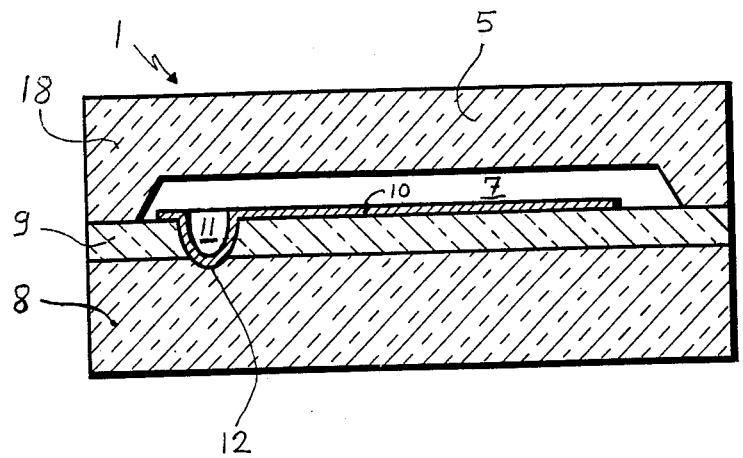
FIG. 2 shows in a sectional side view another embodiment of the transducer in accordance with the invention.
Figure 3:
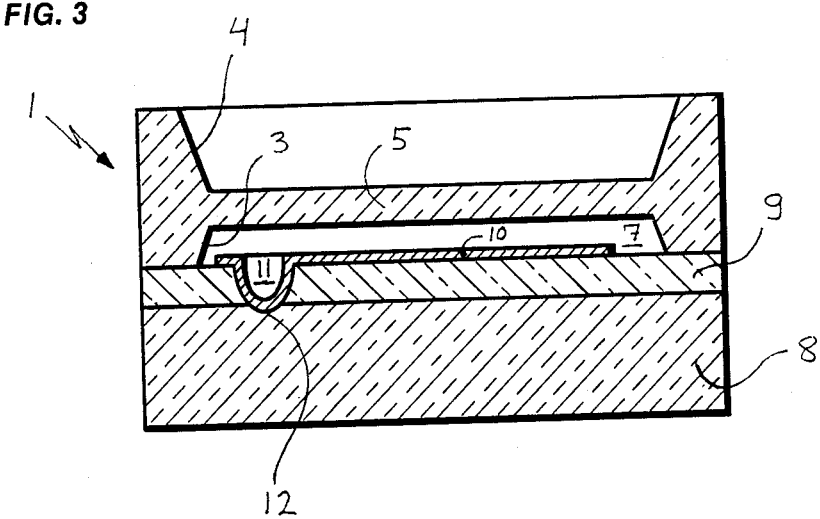
FIG. 3 shows in a sectional side view a third embodiment of the transducer in accordance with the invention.
Figure 4A:
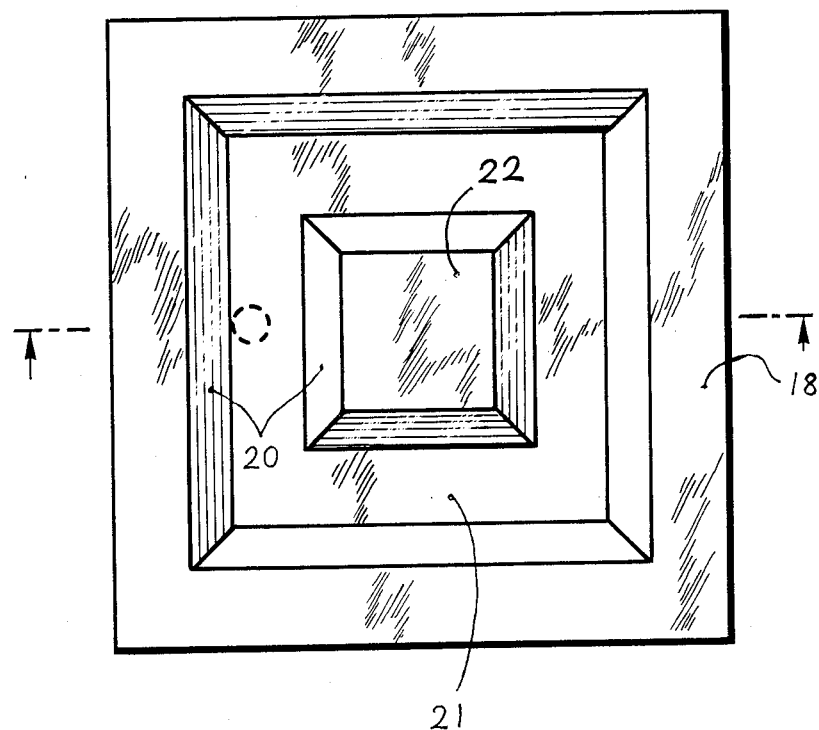
FIGS. 4A and 4B show in a sectional side view a fourth embodiment of the transducer in accordance with the invention.
Figure 4B:
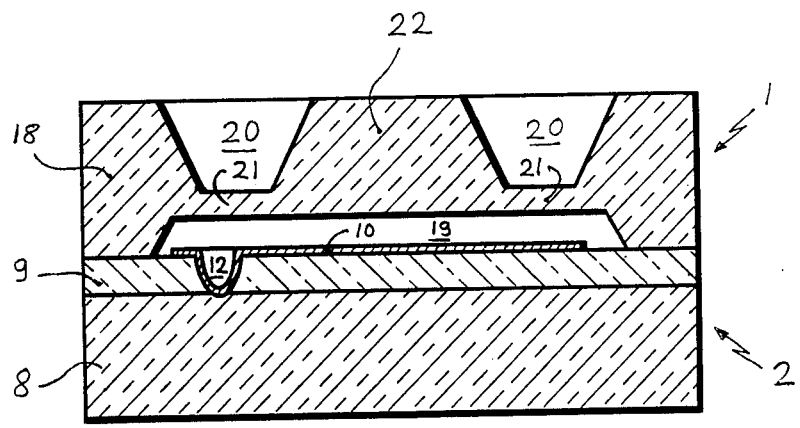
Figure 5:
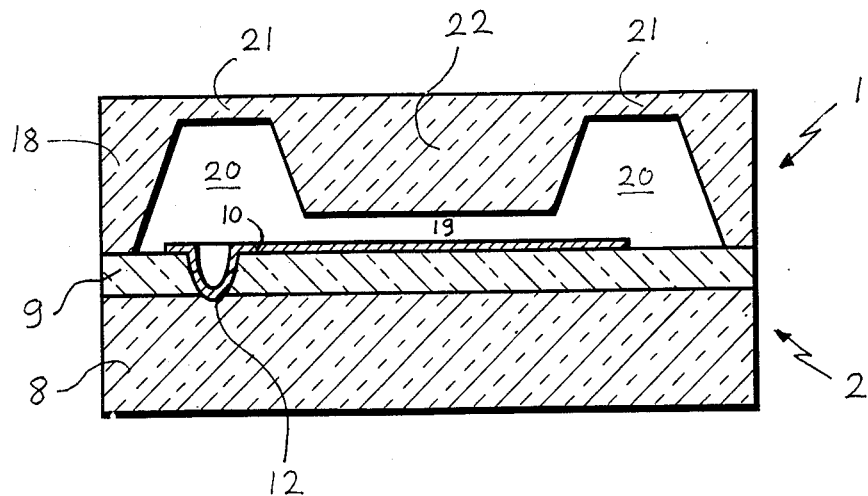
FIG. 5 shows in a sectional side view a fifth embodiment of the transducer in accordance with the invention.

The constructions shown in FIGS. 4A, 4B, and 5 are more complicated to fabricate, and their size will be larger than that shown in FIGS. 2 and 3. However, these embodiments present some advantages, such as: more than twofold pressure sensitivity of capacitance with the same basic dimensions and fabrication tolerances, and better than tenfold improvement in nonlinearity error, compared with the constructions shown in FIGS. 2 and 3.

The elastic element shown in FIGS. 4A, 4B is fabricated using the chemical processing methods described in reference (7), or a similar method. The basic material is a silicon wafer 1 with a thickness of 0.2... 1 mm. Using photolithographic methods, an area 19 is defined on its one surface and etched to a desired depth. The depth of the etched area 19 determined the spacing of the capacitor electrodes. Again using photolithography, on the other side of the silicon wafer 1 an annular area 20 is defined which is also etched to a desired depth. Between the bottoms of areas 19 and 20 there remains a silicon diaphragm 21, with a thickness of maximally one-fifth of the thickness of the basic material. The silicon diaphragm 21 is annular. At its center remains an area 22 with a thickness equal to that of the silicon wafer 18 and a stiffness of at least a hundred-fold compared with that of the silicon diaphragm 21. The width of the area 22 is in the order of 0.5... 5 mm. The width of the ring 20 (silicon diaphragm 21) is in the order of 0.2... 2 mm. The silicon diaphragm 21 is flexed when a pressure difference is applied between the surfaces of the silicon wafer 1. The solid silicon part 22 will not flex but instead moves undeformed with the flexure of the silicon diaphragm 21.

The elastic element shown in FIG. 5 is by its construction almost identical with that shown in FIG. 4. The only difference is that the area defining the capacitor air gap 19 is configured on the same surface of the silicon wafer 1 as the ring-formed area 20. The other surface of the silicon diaphragm 21 is then formed by the original surface of the silicon wafer 1. The bonding of the elastic element to the substrate 23 is done from the opposite side of the silicon wafer 1, compared with the construction shown in FIGS. 4A, 4B.

Figure 6:
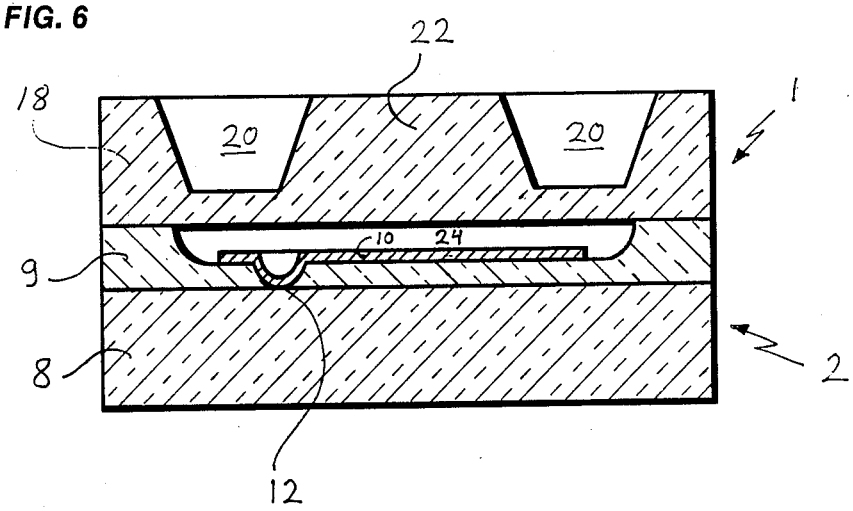
FIG. 6 shows in a sectional side view a sixth embodiment of the transducer in accordance with the invention.

The elastic elements shown in FIGS. 2, 3, 4A, 4B, and 5 can also be bonded to the substrate 2 according to FIG. 6 so that the capacitor electrode spacing is determined by an etched well 24 on the glass plate 23.

What is claimed is:

1. A capacitive absolute pressure transducer comprising:
   a base plate of an insulating material
   a fixed capacitor electrode disposed on the base plate,
   a moving capacitor electrode diaphragm of silicon, at least partly aligned with the fixed capacitor electrode, and spaced from it so that a hermetically sealed chamber is formed between the fixed electrode and the moving diaphragm electrode, and
   electrical contacts attached to the fixed electrode and moving diaphragm electrode, respectively,
   the base plate being bonded with a conductive material wafer to obtain a laminated substrate,
   the diaphragm electrode of the capacitor being essentially an integrated structure with the surrounding and essentially thicker collar part, and
   the electrical path to the fixed capacitor electrode in the area of the vacuum chamber being formed by a well that penetrates the base plate to the conductive wafer.

2. The transducer as claimed in claim 1, the conductive wafer is of silicon and essentially thicker than the base plate.

3. The transducer as claimed in claim 2, wherein the moving diaphragm electrode is provided in its center area with a stiff part, essentially thicker than the diaphragm part and surrounded by an annular well.

4. The transducer as claimed in claim 2, wherein the surface of the wafer facing the base plate is doped heavily conductive.

5. The transducer as claimed in claim 2, wherein the surface of the base plate is provided with an encircling grounded metal film pattern which, at a distance, entirely surrounds the collar part.

6. The transducer as claimed in claim 1, further comprising a collar part of said moving capacitor electrode diaphragm extending from the moving diaphragm electrode of the capacitor towards the base plate.

7. The transducer as claimed in claim 1, further comprising a collar part of said moving capacitor electrode diaphragm extending outwards from the moving diaphragm electrode of the capacitor so that an outer surface of the diaphragm and an inner surface of the collar part define a well-shaped space.

8. The transducer as claimed in claim 1, further comprising a collar part of said moving capacitor electrode diaphragm extending both outward and inward from the moving diaphragm electrode.

9. The transducer as claimed in claim 1, wherein the surface of the base plate facing the diaphragm electrode is provided with a well to implement a vacuum chamber.

10. The transducer as claimed in claim 1, wherein the well for the electrical contact is a conical hole through the base plate, narrowing towards the wafer and metallized on its surface.

11. The transducer as claimed in claim 10, wherein the metallization of said well is integral with the fixed electrode of the capacitor.

12. The transducer as claimed in claim 1, wherein the electrical circuit consisting of the well between the fixed capacitor electrode and the wafer is complemented with, a second well, implemented with an external conductive area which passes through the wafer to the vacuum chamber.

13. The transducer of claim 1 wherein said base plate is composed of glass.

* * * * *